United States Patent
Kobayashi et al.

(10) Patent No.: US 10,292,171 B2
(45) Date of Patent: May 14, 2019

(54) TERMINAL DEVICE AND COMMUNICATION SYSTEM

(71) Applicant: Sharp Kabushiki Kaisha, Sakai, Osaka (JP)

(72) Inventors: Hirokazu Kobayashi, Sakai (JP); Tamotsu Satoh, Sakai (JP); Hideaki Shinmei, Sakai (JP); Hiroyuki Saga, Sakai (JP); Katsutoshi Ishikura, Sakai (JP); Atsushi Yamazaki, Sakai (JP); Kennichi Iijima, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/574,730

(22) PCT Filed: May 13, 2016

(86) PCT No.: PCT/JP2016/064277
§ 371 (c)(1),
(2) Date: Nov. 16, 2017

(87) PCT Pub. No.: WO2011/186025
PCT Pub. Date: Nov. 24, 2016

(65) Prior Publication Data
US 2018/0146483 A1 May 24, 2018

(30) Foreign Application Priority Data
May 21, 2015 (JP) .................................. 2015-103742

(51) Int. Cl.
*H04W 72/08* (2009.01)
*H04W 88/04* (2009.01)
(Continued)

(52) U.S. Cl.
CPC ...... *H04W 72/082* (2013.01); *H04W 72/0453* (2013.01); *H04W 88/04* (2013.01); *H04W 88/06* (2013.01)

(58) Field of Classification Search
CPC ............... H04W 72/082; H04W 72/04; H04W 72/0453; H04W 72/08; H04W 88/04; H04W 88/06
(Continued)

(56) References Cited

U.S. PATENT DOCUMENTS

| 2011/0312288 A1 | 12/2011 | Fu et al. |
| 2014/0233502 A1* | 8/2014 | Fong ..................... H04W 72/02 370/329 |
| 2015/0304872 A1* | 10/2015 | Sadek ................... H04W 24/10 370/252 |

FOREIGN PATENT DOCUMENTS

| JP | 2007-251935 A | 9/2007 |
| JP | 2013-172341 A | 9/2013 |
| JP | 2013-535139 A | 9/2013 |

* cited by examiner

*Primary Examiner* — Chi Tang P Cheng
(74) *Attorney, Agent, or Firm* — ScienBiziP, P.C.

(57) ABSTRACT

A terminal device and a communication system which are capable of starting LAA communication with a lower possibility of interference are provided. A communication unit performs communication using each of a first network and a second network. A communication control unit notifies a base station device constituting the first network of allocated frequency band exclusion information indicating a frequency band to be excluded from frequency bands allocated to the terminal device, and controls the communication unit so as to connect to the base station device using a frequency band allocated by the base station device.

6 Claims, 5 Drawing Sheets

(51) Int. Cl.
*H04W 88/06* (2009.01)
*H04W 72/04* (2009.01)

(58) Field of Classification Search
USPC .......................................................... 370/329
See application file for complete search history.

| CHANNEL | CENTER FREQUENCY (MHz) |
|---|---|
| CHANNEL A | 5180 |
| CHANNEL B | 5200 |
| CHANNEL C | 5220 |
| CHANNEL D | 5240 |
| CHANNEL E | 5260 |

TERMINAL DEVICE AND COMMUNICATION SYSTEM

TECHNICAL FIELD

The present invention relates to a terminal device and a communication system, and more particularly to a wireless communication system used in a cellular phone network.

This application claims priority based on Japanese Patent Application No. 2015-103742 filed in Japan on May 21, 2015, the entire content of which is incorporated herein by reference.

BACKGROUND ART

With the development of wireless communication technology, usage modes of wireless communication have become diversified. One of the usage modes is tethering. Tethering is a function of a wireless terminal device which is capable of being connected to a public wireless communication network (PLMN) and has a base station function of a wireless local area network (LAN) to relay communication of other electronic devices which can be connected to the wireless LAN to the public wireless communication network. Other electronic devices (hereinafter, referred to as a wireless LAN terminal) which can be connected to a wireless LAN include, for example, a personal computer (PC), a tablet terminal device, and the like. The wireless terminal device (hereinafter, referred to as a tethering terminal) which is capable of being connected to a public wireless communication network and has a base station function of a wireless LAN is, for example, a mobile phone with a wireless LAN function (including a so-called smart phone).

Here, use of license assisted access using LTE (LAA) as a communication method between a base station device and a tethering terminal device of a public wireless communication network is under review. LAA is a communication method which uses long term evolution (LTE) using an unlicensed band. In addition, when the presence of another network using an unlicensed band, such as wireless LAN communication, is detected, a base station using an LAA communication method avoids a frequency band used by these types of communication and performs communication so as not to disturb these types of communication. However, when a tether terminal is located in the vicinity of a cell edge, the base station device may not be able to detect wireless LAN communication between a tethering terminal device and a wireless LAN terminal. A cell edge is a boundary of a cell which is a range within which radio waves from the base station device can reach. In addition, when the base station device is outside of the range but the tethering terminal device is positioned within the range in which another communication device such as an access point (AP; hereinafter, referred to as wireless LAN AP or simply an AP) of a wireless LAN is present, even if the communication device is an interference source with respect to the tethering terminal device, the base station device may not be able to detect communication of the communication device in some cases. In these cases, the base station device can allocate a frequency band overlapping with a frequency band used for communication using a wireless LAN to communication with the tethering terminal device. Because LAA does not require a license, LAA is operated by communication carriers of various types, and there is a possibility that mutual cooperation may not be sufficiently performed. This may also be a factor increasing a possibility that a frequency band may be allocated which overlaps between a PLMN and a wireless LAN.

In this regard, Patent Document 1 describes, for example, a user device which cooperates with a multiple wireless transceiver co-installed in a device to reduce coexisting interference. The user device includes an LTE transceiver, a Bluetooth (BT, registered trademark) transceiver, or a global navigation satellite system (GNSS) transceiver, and performs communication by using a plurality of transceivers at the same time. In addition, when interference between LAA communication and communication of another transceiver occurs, the interference is eliminated by requesting handover to an LAA base station device and changing a frequency band used for the LAA communication.

PRIOR ART DOCUMENT

Patent Document

[Patent Document 1]
Published Japanese Translation No. 2013-535139 of the PCT International Publication

SUMMARY OF THE INVENTION

Problem to be Solved by the Invention

However, in the wireless communication system described in Patent Document 1, since a terminal device changes a frequency band of the LAA communication by handover when actually detecting interference from radio waves, there has been a problem that it is difficult to avoid interference from radio waves immediately after a start of communication.

The present invention has been made in view of the above problems, and an object of the present invention is to provide a terminal device and a communication system which are capable of starting LAA communication with a lower possibility of interference.

Means for Solving the Problems

The present invention is made to solve the above-described problem, and one aspect of the present invention is a terminal device including: a communication unit configured to perform communication using each of a first network and a second network; and a communication control unit configured to notify a base station device constituting the first network of allocated frequency band exclusion information indicating a frequency band to be excluded from frequency bands allocated to the terminal device, and control the communication unit so as to connect to the base station device using a frequency band allocated by the base station device.

Effect of the Invention

According to the present invention, it is possible to provide a terminal device and a communication system which are capable of starting LAA communication with a lower possibility of interference.

EMBODIMENTS FOR CARRYING OUT THE INVENTION

First Embodiment

Figure 1:
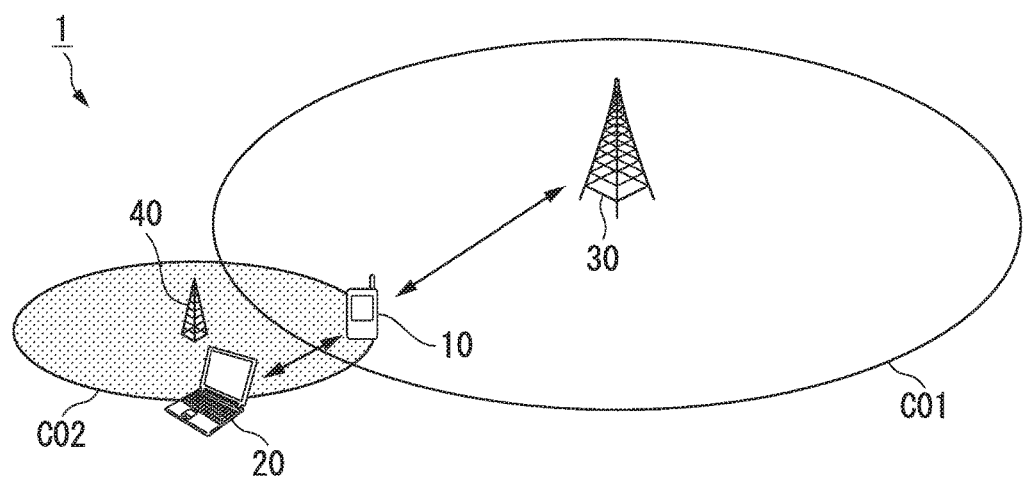
FIG. 1 is a block diagram which shows a configuration of a communication system according to a first embodiment.

First, a first embodiment of the present invention will be described. FIG. 1 is a block diagram which shows a configuration of a communication system 1 according to the present embodiment.

The communication system 1 is configured to include a first terminal device 10, a second terminal device 20, and a base station device 30.

The first terminal device 10 is a communication device having a communication function of wirelessly transmitting or receiving data to or from a counterpart device (not shown) which is a communication partner via the base station device 30. The communication functions include, for example, voice communication with a counterpart terminal device, message exchange (e-mail), acquisition (browsing) of document data from a web server connected to the Internet, and the like. In addition, the first terminal device 10 has a function of a wireless LAN AP at the same time. The first terminal device 10 communicates with the second terminal device 20 having a wireless LAN terminal function using a predetermined communication method such as a method prescribed in IEEE 802.11, and relays communication with the counterpart device (not shown) of the second terminal device 20 via the base station device 30. That is, the first terminal device 10 is used as a tethering terminal. The first terminal device 10 is, for example, a mobile phone (including a so-called smart phone), a tablet terminal device, a wireless communication card, or the like.

The base station device 30 is a communication device which provides communication via a public wireless communication network to the first terminal device 10 located in a cell C01 which is a range within which radio waves can reach from the base station device 30. The base station device 30 relays user data between the first terminal device 10 and a counterpart device via a core network accommodating the base station device 30. Communication between the first terminal device 10 and the base station device 30 is performed using a predetermined communication method such as LTE or LAA. The core network is connected to other networks such as the Internet.

The AP 40 is a communication device which provides communication by a wireless LAN to a terminal device located in a cell C02 which is a range within which radio waves from the AP 40 can reach. In an example shown in FIG. 1, the first terminal device 10 is located in the cell C02. Even if the first terminal device 10 does not communicate with the AP 40, when a frequency band used for communication in an LAA method by the first terminal device and the base station device 30 is the same as or close to a frequency band used for communication by the base station AP, there is a possibility that radio waves transmitted from the base station device 30 to the first terminal device 10 may not reach the first terminal device due to interference from radio waves used for communication by the AP 40.

For example, in the example shown in FIG. 1, the first terminal device 10 is located in the range of the cell C01 and can perform communication by a public wireless communication network via the base station device 30 and communication with the second terminal device 20 by a wireless LAN. For each communication, a base station (AP in a wireless LAN) which is a main body for determining a frequency band used for communication selects a frequency band which is not used for peripheral communication, and thereby interference is avoided. For example, when a frequency band with a center frequency of 5180 MHz is used between the first terminal device 10 and the base station device 30, the first terminal device 10 operating as a wireless LAN AP as well sets a frequency band used for the communication between the first terminal device 10 and the second terminal device 20 to a frequency band with a center frequency of 5220 MHz, and thereby interference between these communications is avoided.

However, the first terminal device 10 is located in the vicinity of a cell edge of the cell C01. In addition, the first terminal device 10 is positioned within the range of the cell C02, but the base station device 30 is not positioned within the range of the cell C02. For this reason, in a conventional communication system, interference cannot be avoided because the base station device 30 cannot detect radio waves from the AP 40 in the first terminal device 10. For example, the AP 40 may be assumed to use the frequency band with a center frequency of 5180 MHz. The first terminal device 10 operating as a wireless LAN AP sets a frequency band used for the communication between the first terminal device 10 and the second terminal device 20 to the frequency band with a center frequency of 5220 MHz, and thereby interference between this communication and radio waves from the AP 40 is avoided. However, since the base station device 30 cannot detect the radio waves from the AP 40, there is a possibility that the frequency band with a center frequency of 5180 MHz is used as a frequency band not used for peripheral communication.

In this case, the radio waves from the base station device 30 interfere with the radio waves from the AP 40 in the first terminal device 10, and there is a possibility that the communication between the first terminal device 10 and the base station device 30 may not be established.

In the example shown in FIG. 1, the numbers of first terminal devices 10, second terminal devices 20, base station devices 30, and APs 40 are one of each for explanation, but are generally more than one.

Next, a configuration of the first terminal device 10 will be described.

Figure 2:
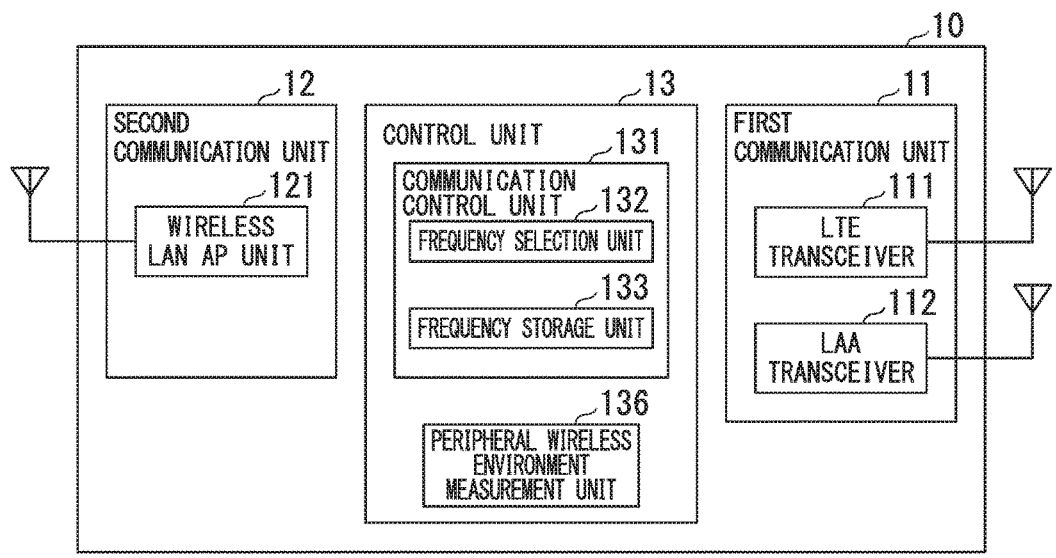
FIG. 2 is a block diagram which shows a configuration of a terminal device according to the first embodiment.

FIG. 2 is a block diagram which shows the configuration of the first terminal device 10 according to the present embodiment.

The first terminal device 10 is configured to include a first communication unit 11, a second communication unit 12, and a control unit 13.

The first communication unit 11 is configured to include an LTE transceiver 111 and an LAA transceiver 112. The LTE transceiver 111 wirelessly transmits or receives various types of data to or from the base station device 30 using an LTE method. The LAA transceiver 112 wirelessly transmits or receives various types of data to or from the base station apparatus 30 using the LAA method.

The second communication unit 12 is configured to include a wireless LAN AP unit 121. The wireless LAN AP unit 121 performs data communication with another terminal device as a wireless LAN AP using a wireless LAN communication standard such as a communication method prescribed in IEEE 802.11 (hereinafter, referred to as wireless LAN). The first communication unit 11 and the second communication unit 12 are, for example, communication interfaces and each is connected to an antenna. In the following description, each of the first communication unit 11 and the second communication unit 12 or both of these communication units may be collectively referred to as a communication unit. In addition, it may not be mentioned in the following description that transmission and reception of various types of data between the control unit 13 and another device are performed via the communication unit.

The control unit 13 is configured to include a communication control unit 131 and a peripheral wireless environment measurement unit 136. The control unit 13 is configured to include a processing device such as a central processing unit (CPU), or a storage medium such as a random access memory (RAM). The control unit 13 may realize functions of the communication control unit 131, the peripheral wireless environment measurement unit 136, and the like by executing a command instructed by a predetermined program.

The communication control unit 131 performs control of communication in which the first terminal device 10 is a transmission source or a reception destination, and performs control related to tethering for relaying communication between the first terminal device 10 and the second terminal device 20 to the base station device 30. In these types of control, the communication control unit 131 performs processing related to, for example, a data transmission or reception start or end, a frequency band request or change, and the like. The communication control unit 131 transmits a frequency band request signal indicating a request for a frequency band used for communication in a predetermined method (for example, LAA method) to the base station device 30 by, for example, an instruction to start tethering from a user, and the like. In addition, the communication control unit 131 transmits a frequency band used for wireless LAN communication between the first terminal device 10 and the second terminal device 20 and a peripheral frequency band report signal indicating an interference situation of a frequency band measured by the peripheral wireless environment measurement unit 136 to the base station device 30. The communication control unit 131 establishes a connection with the base station device 30 using a frequency band (allocated frequency band) indicated by a frequency band allocation signal received from the base station device 30. Thereafter, the communication control unit 131 relays various data in communication between the second terminal device 20 and a counterpart device via, for example, communication with the base station device 30 in the LAA method.

The communication control unit 131 is configured to include a frequency selection unit 132 and a frequency storage unit 133. The frequency storage unit 133 stores candidates for a center frequency which is a frequency representing a frequency band (hereinafter, referred to as a tethering frequency band) of an unlicensed band for each frequency band (channel) in advance.

The frequency selection unit 132 determines a frequency band of radio waves used for wireless LAN communication on the basis of an instruction of a user and the like. The frequency selection unit 132 selects a center frequency corresponding to the determined frequency band from the center frequency candidates stored in the frequency storage unit 133 in advance. The frequency selection unit 132 transmits a tethering frequency report signal indicating the selected center frequency to the base station device 30. The frequency selection unit 132 may automatically select a frequency band which is not used for peripheral communication on the basis of a result of measurement by a peripheral wireless environment measurement unit 136 to be described below.

The peripheral wireless environment measurement unit 136 measures a frequency band (peripheral frequency band) which can be used for communication via the base station device 30 on the basis of an electrical signal based on radio waves received by an antenna connected to the first communication unit 11 and the second communication unit 12. The antenna receives radio waves from various types of devices in the vicinity of the AP 40 and the first terminal device 10. The peripheral wireless environment measurement unit 136, for example, acquires an electric field intensity for each frequency and determines a frequency band in which the acquired electric field intensity is higher than a predetermined electric field intensity. The peripheral wireless environment measurement unit 136 decides the determined frequency band as a peripheral frequency band. As the peripheral frequency band, for example, a frequency band in which the AP 40 is used for communication with other communication devices is detected. The peripheral wireless environment measurement unit 136 transmits a peripheral frequency band report signal indicating the selected peripheral frequency band to the base station device 30. As a result, the base station device 30 can allocate an allocated frequency band, obtained by excluding a tethering frequency band and a frequency band indicated by the peripheral frequency band report signal from frequency bands in which the base station device 30 can transmit and receive various types of data, for communication with the first terminal device 10. Communication control processing performed between the first terminal device 10, the second terminal device 20, and the base station device 30 will be described below.

(Center Frequency)

Next, an example of a center frequency stored in the frequency storage unit 133 will be described.

Figures 3, 4:
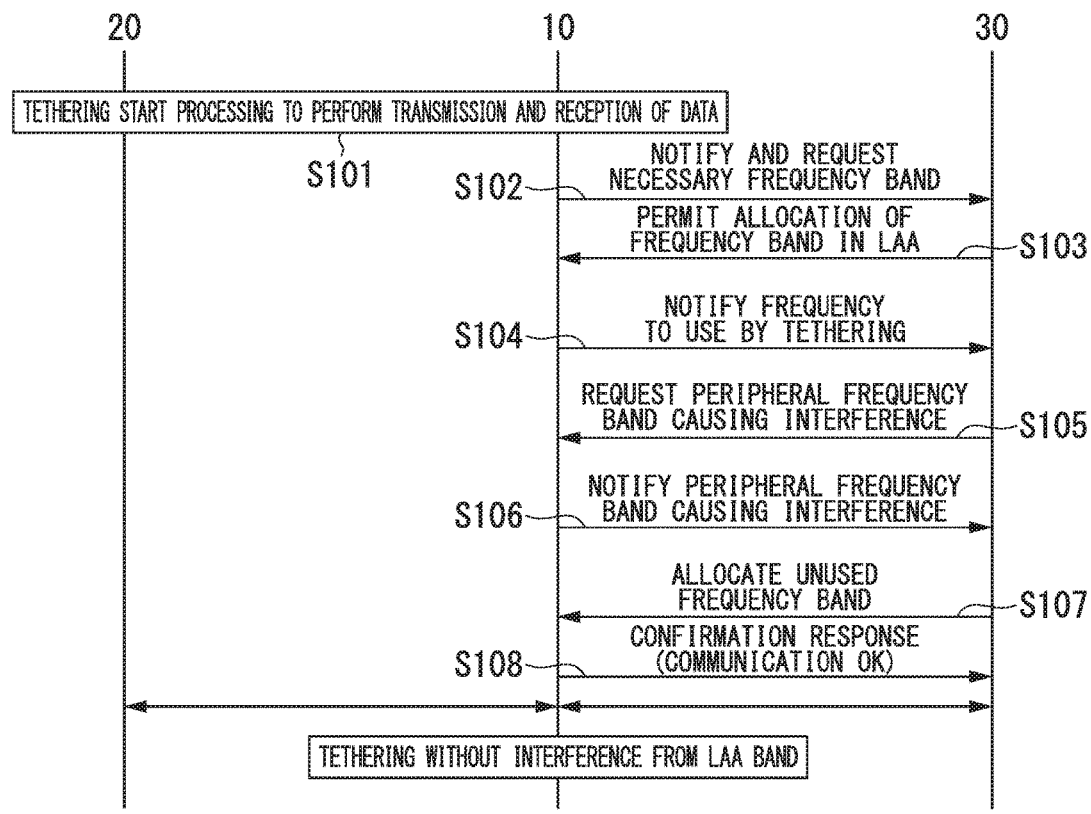
FIG. 3 is a diagram which shows an example of center frequencies.
FIG. 4 is a flowchart which shows an example of communication control processing according to the first embodiment.

FIG. 3 is a diagram Which shows an example of center frequencies. In the example shown in FIG. 3, each of five frequency bands A to E has a center frequency set to 5180, 5200, 5220, 5240, and 5260 MHz at 20 MHz intervals. All frequency bands are included in an unlicensed band of a 5 GHz band used for communication in the LAA method. In this example, radio waves do not overlap each other between frequency bands, but when any frequency band is used for the communication between the first terminal device 10 and the second terminal device 20, interference may occur due to allocating, using the base station device 30, a frequency band including a portion or all of the frequency band for the communication between the base station device 30 and the first terminal device 10 in some cases. As described above, the base station device 30 cannot detect the interference which has occurred. In the present embodiment, interference is avoided by communication control processing to be described below.

(Communication Control Processing)

Next, an example of communication control processing according to the present embodiment will be described.

FIG. 4 is a flowchart which shows an example of the communication control processing according to the present embodiment.

The processing shown in FIG. 4 has a case in which the first terminal device 10 starts processing for relaying communication with the second terminal device 20 to the base station device 30 using a tethering function as an example. In addition, a case in which the communication between the first terminal device 10 and the base station device 30 is performed using the LAA method, and the communication between the first terminal device 10 and the second terminal device 20 is performed by a wireless LAN is taken as an example.

(Step S101) The first terminal device 10 performing the wireless LAN communication with the second terminal device performs tethering start processing when, for example, an operation input of a user is received. The communication control unit 131 sets a frequency band for performing communication with the second terminal device 20 in the wireless LAN AP unit 121 as a tethering frequency band. Thereafter, the processing proceeds to step S102.

(Step S102) The communication control unit 131 of the first terminal device 10 transmits a frequency band request signal used for the LAA communication to the base station device 30. Thereafter, the processing proceeds to step S103.

(Step S103) The base station device 30 determines whether a bandwidth of a frequency band indicated by the frequency band request signal can be ensured in an unused frequency band which enables transmission and reception of data. When it is determined that the bandwidth can be ensured, the base station device 30 generates a permission/rejection signal indicating permission to allocate the frequency band for communication, and when it is determined that the bandwidth cannot be ensured, the base station device 30 generates a permission/rejection signal indicating a rejection of allocation of the frequency band. The base station device 30 transmits a generated permission/rejection signal to the first terminal device 10. Then, the processing proceeds to step S104.

(Step S104) when the permission/rejection signal received from the base station device 30 indicates permission to increase the bandwidth, the frequency selection unit 132 of the first terminal device 10 selects a center frequency corresponding to a specified tethering frequency band from the frequency storage unit 133. The frequency selection unit 132 transmits a tethering frequency report signal indicating the selected center frequency to the base station device 30. Thereafter, the processing proceeds to step S105. When the permission/rejection signal received from the base station device 30 indicates a rejection of increasing the bandwidth, the processing shown in FIG. 4 is completed.

(Step S105) The base station device 30 transmits a peripheral frequency band notification request signal indicating a notification request for a peripheral frequency band causing interference according to a start of communication via the base station device 30 to the first terminal device 10. Thereafter, the processing proceeds to step S106.

(Step S106) The peripheral wireless environment measurement unit 136 of the first terminal device 10 measures a peripheral frequency band from radio waves received from peripheral devices. When a peripheral frequency band notification request signal is received from the base station device 30, the communication control unit 131 transmits a peripheral frequency band report signal indicating a peripheral frequency band measured as a response to the base station device 30. Thereafter, the processing proceeds to step S107.

(Step S107) The base station device 30 allocates a frequency band obtained by excluding a frequency band corresponding to a center frequency indicated by a tethering frequency report signal received from the first terminal device 10 and a frequency band indicated by a peripheral frequency band report signal among unused frequency bands which enable transmission and reception of data to the first terminal device 10. The base station device 30 transmits a frequency band allocation signal indicating the allocated frequency band (allocated frequency band) to the first terminal device 10. Thereafter, the processing proceeds to step S108.

(Step S108) The communication control unit 131 of the first terminal device 10 receives a frequency band allocation signal from the base station device 30, and transmits a confirmation signal (OK) to the base station device 30 as a response. The communication control unit 131 establishes a connection between the base station device 30 and the first terminal device 10 by transmitting the confirmation signal. In addition, the communication control unit 131 sets an allocated frequency band indicated by the frequency band allocation signal as a frequency band used in transmission or reception of data to or from the base station device 30 in the LAA transceiver 112. Then, the communication control unit 131 starts to relay (tethering) communication with the second terminal device 20 and communication with the base station device 30. In tethering, the communication control unit 131 transmits data received from the second terminal device 20 via the wireless LAN AP unit 121 to the base station device 30 via the LAA transceiver 112. In addition, the communication control unit 131 transmits the data received from the base station device 30 via an LAA transceiver 112 to the second terminal device 20 via the wireless LAN AP unit 121.

In the example described above, it is assumed that a frequency band with a center frequency of 5180 MHz is used for communication between the first terminal device 10 and the second terminal device 20, and a frequency band with a center frequency of 5220 MHz is used for communication between another terminal device and the AP 40. In this case, according to the processing shown in FIG. 4, the base station device 30 allocates a frequency band different from these frequency bands, for example, a frequency band with a center frequency of 5260 MHz to communication with the first terminal device 10 using the LAA method. For this reason, tethering can be executed without causing interference between a frequency band used for communication by the wireless LAN and a frequency band used for the communication in the LAA method.

Next, another example of the communication control processing according to the present embodiment will be described.

Figure 5:
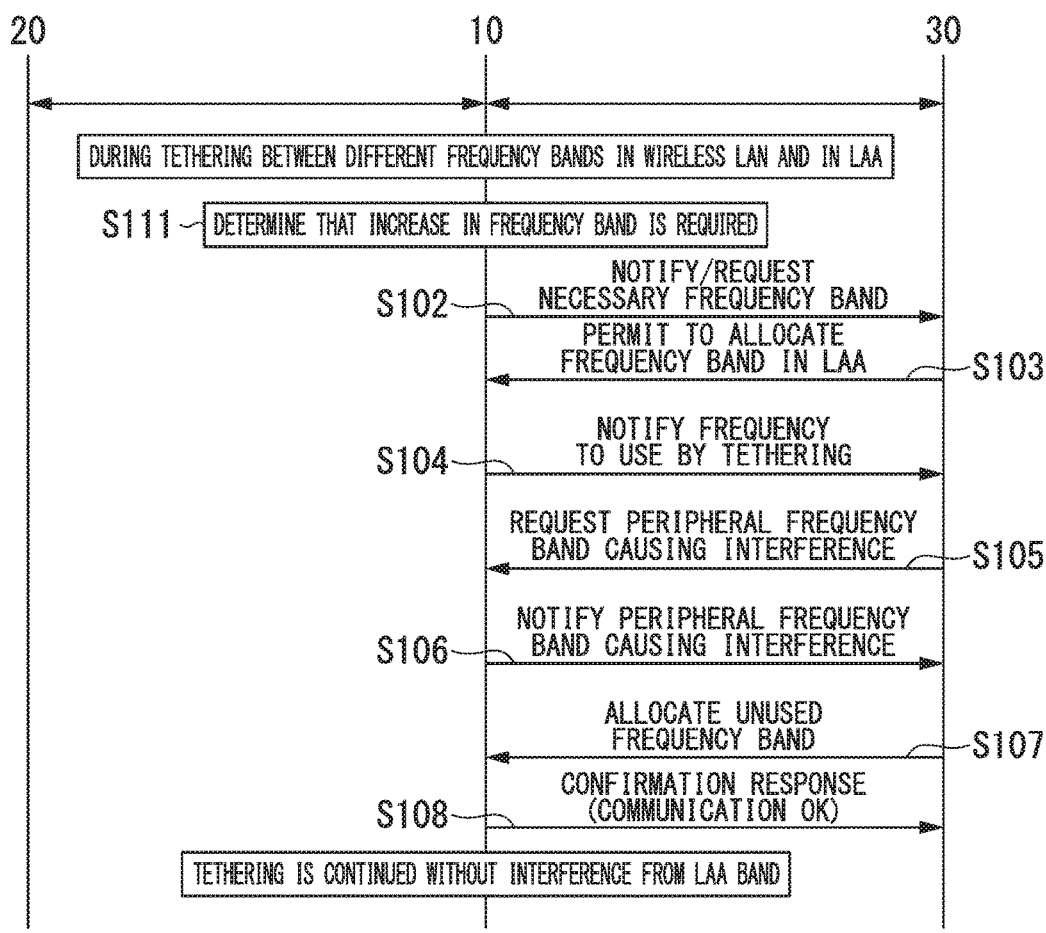
FIG. 5 is a flowchart which shows another example of communication control processing according to the first embodiment.

FIG. 5 is a flowchart which shows another example of communication control processing according to the present embodiment.

The processing shown in FIG. 5 has a case in which the first terminal device 10 is started while tethering between communication with the second terminal device 20 and communication with the base station device 30 is executed as an example.

The processing shown in FIG. 5 has step S111 and steps S102 through S108.

(Step S111) The communication control unit 131 of the first terminal device 10 determines whether to require an increase in frequency band in communication with the base station device 30. When it is determined that an increase in frequency band is required, the processing proceeds to step S102. When it is determined that an increase is not required, the processing shown in FIG. 5 is completed.

A requirement for an increase in frequency band means that communication with higher speed is needed. An increase in frequency band is required in cases, for example, when an amount of data relayed to or from the second terminal device 20 exceeds an amount of data which can be transmitted with a bandwidth of a frequency band used at this time or when there is a possibility of this being exceeded. In addition, an increase in frequency band is also required when other terminal devices, in addition to the second terminal device 20, request tethering via the first terminal device 10. In this case, the first terminal device 10 and the base station device 30 perform the processing shown in FIG. 5 on other terminal devices, in addition to the second terminal device 20.

According to the processing shown in FIG. 5, the base station device 30 allocates a frequency band, which is different from a frequency band used for communication by another terminal device not related to tethering such as the AP 40, to a tethering frequency band used for the communication between the first terminal device 10 and the second terminal device 20 for communication with the first terminal device 10 using the LAA method. For this reason, it is possible to increase a communication speed without causing interference between a frequency band used for communication using a wireless LAN and a frequency band used for the communication in the LAA method in tethering.

In the processing shown in FIGS. 4 and 5, step S105 may be omitted. In this case, in step S106, the communication control unit 131 may also automatically transmit a peripheral frequency band report signal to the base station device 30 at predetermined time intervals (for example, one second).

As described above, the first terminal device 10 according to the present embodiment includes the second communication unit 12 performing communication using a wireless LAN, and the first communication unit 11 performing communication using a public wireless communication network in the LAA method. In addition, the first terminal device 10 includes a peripheral wireless environment measurement unit 136 which measures a frequency band causing interference in the communication using a public wireless communication network. In addition, the first terminal device 10 notifies the base station device 30 constituting the public wireless communication network of a request for a frequency band used for the communication using a public wireless communication network and the frequency band measured by the peripheral wireless environment measurement unit 136. Moreover, the first terminal device 10 includes the communication control unit 131 connected to the base station device 30 using the frequency band allocated by the base station device 30.

With such a configuration, the base station device 30 can allocate a frequency band obtained by excluding the frequency band causing interference in the first terminal device 10 among available frequency bands to communication with the first terminal device 10. For this reason, the first terminal device 10 can start communicating with the base station device 30 in a state of not being subject to interference from a frequency band of radio waves used in a wireless LAN which is controlled independently from a peripheral wireless environment, for example, the public wireless communication network.

In addition, the communication control unit 131 includes a frequency storage unit 133 which stores frequency information indicating a predetermined frequency band used for the communication using a wireless LAN. Moreover, the communication control unit 131 includes the frequency selection unit 132 which selects frequency information of a frequency band used for communication with the second terminal device 20 from the frequency storage unit 133 and notifies the base station device 30 of the selected frequency information when the frequency band is requested.

With such a configuration, the base station device 30 can determine a frequency band used in a wireless LAN by the first terminal device 10 and allocate a frequency band obtained by excluding the frequency band to communication with the first terminal device 10. For this reason, the first terminal device 10 can start communicating with the base station device 3 in the state of not receiving interference from a frequency band of radio waves used for communication via a wireless LAN which is controlled independently from a public wireless communication network.

Second Embodiment

Next, a second embodiment of the present invention will be described. Constituents the same as those in the embodiment described above will be given the same reference numerals and description thereof can be referred to.

Figure 6:
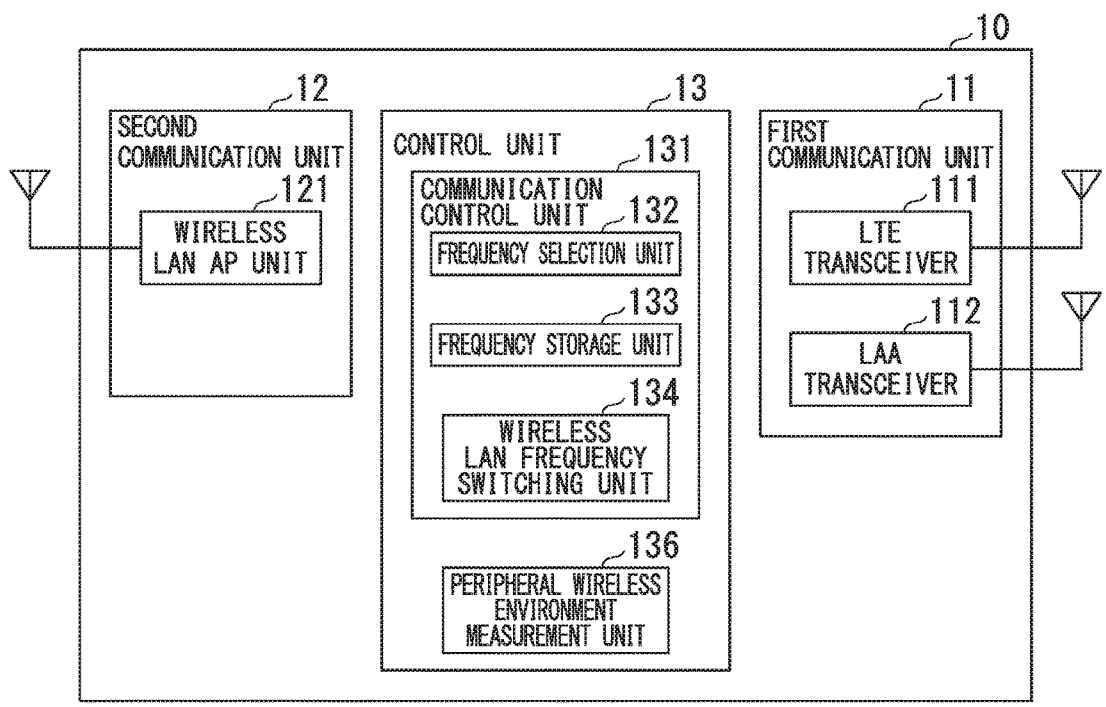
FIG. 6 is a block diagram which shows a configuration of a first terminal device according to a second embodiment.

FIG. 6 is a block diagram which shows a configuration of the first terminal device 10 according to the present embodiment.

The communication control unit 131 of the first terminal device 10 according to the present embodiment is configured to further include a wireless LAN frequency switching unit 134.

The wireless LAN frequency switching unit 134 determines whether an allocated frequency band indicated by a frequency band allocation signal received from the base station device 30 is a frequency band causing interference with a tethering frequency band used for communication with the second terminal device 20. Here, the wireless LAN frequency switching unit 134 determines that an allocated frequency band is a frequency band causing interference when a portion or all of the allocated frequency band overlaps with a portion of all of a tethering frequency band, and determines that the allocated frequency band is not a frequency band causing interference when the allocated frequency band does not overlap with the tethering frequency band. When it is determined that the allocated frequency band is a frequency band causing interference, the wireless LAN frequency switching unit 134 sets any frequency band from unused frequency bands in the wireless LAN AP unit 121 as a new tethering frequency band. The wireless LAN frequency switching unit 134 can set a frequency band which is a 2.4 GHz band in addition to a frequency band which is a 5 GHz band as a frequency band which can be set in the wireless LAN AP unit 121. Here, the first terminal device 10 may also narrow down frequency bands not causing interference on the basis of an electric field intensity for each frequency of radio waves coming from peripheral devices among the unused frequency bands as a candidate for a new tethering frequency band.

When the wireless LAN frequency switching unit 134 sets any one of the unused frequency bands as a new tethering frequency band in the wireless LAN AP unit 121, the second terminal device 20 cannot perform wireless LAN communication with the first terminal device 10. At this time, when it is detected that the second terminal device 20 cannot communicate with the first terminal device 10, the second terminal device 20, with respect to all available frequency bands to the second terminal device 20, checks whether the first terminal device 10 sends out a certain signal, and when a signal from the first terminal device 10 can be detected, the second terminal device 20 performs processing for resuming communication with the first terminal device 10 using the frequency band.

Next, communication control processing according to the present embodiment will be described.

Figure 7:
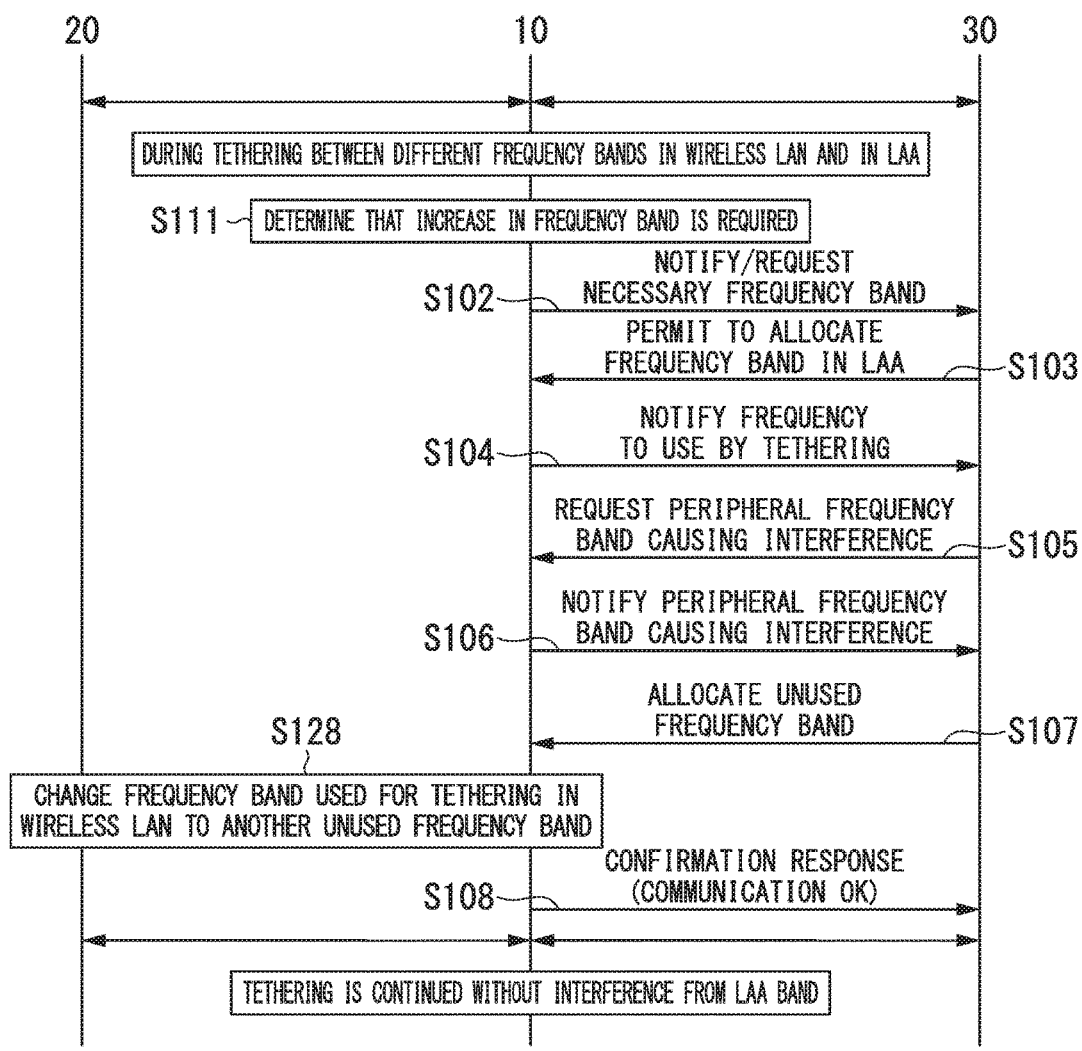
FIG. 7 is a flowchart which shows communication control processing according to the second embodiment.

FIG. 7 is a flowchart which shows the communication control processing according to the present embodiment.

The processing shown in FIG. 7 shows a case in which the first terminal device 10 is started during tethering between communication with the second terminal device 20 and communication with the base station device 30 as an example. The processing shown in FIG. 7 has steps S111, S102 to S107, S128, and S108. In addition, a frequency band with a center frequency of 5180 MHz is used as a tethering frequency band used for the communication between the first terminal device 10 and the second terminal device 20, and it is assumed that the base station device 30 cannot find another unused frequency band and unavoidably allocates an unused frequency band with a center frequency of 5180 MHz as an allocated frequency band in step S107.

(Step S128) The wireless LAN frequency switching unit 134 determines that the allocated frequency band indicated by a frequency band allocation signal received from the base station device 30 is a frequency band causing interference with the tethering frequency band. The wireless LAN frequency switching unit 134 sets any frequency band of unused frequency bands enabling transmission and reception of data, for example, a frequency band of a 2.4 GHz band, as a new tethering frequency band in the wireless LAN AP unit 121. Therefore, a tethering frequency band used in the wireless LAN communication between the first terminal device 10 and the second terminal device 20 is changed to another unused frequency band not overlapping with a frequency band used for the communication between the base station device 30 and the first terminal device 10. Thereafter, the processing proceeds to step S108. Accordingly, even when the frequency band used for tethering communication by the first terminal device 10 is allocated as a frequency band used for the communication in the LAA method, tethering is continued without interference in mutual communication.

Then, when it is detected that the second terminal device 20 cannot communicate with the first terminal device 10, the second terminal device 20 searches for a frequency band of a signal sent out from the first terminal device 10 among the available frequency bands to the second terminal device 20. When the second terminal device 20 detects the frequency band of the signal from the first terminal device 10, the second terminal device 20 performs processing for resuming the communication with the first terminal device 10 using the detected frequency band. Accordingly, the second terminal device 20 can resume the communication with the first terminal device 10.

As described above, the communication control unit 131 in the first terminal device 10 according to the present embodiment includes a wireless LAN frequency switching unit 134 which changes a frequency band used for the communication with the second terminal device 20, when the frequency band allocated by the base station device 30 is a frequency band causing interference with the frequency band used for the communication with the second terminal device 20.

With such a configuration, even if a bandwidth of a frequency band which can be used by the base station device 30 is limited, a frequency band used for communication using a wireless LAN is changed into a frequency band which does not receive interference from the frequency band allocated by the base station device 30. For this reason, it is possible to start communication with the base station device 30 in a state of not receiving interference from other communication by avoiding interference between a frequency band used for communication using a wireless LAN and a frequency band used for communication via a public wireless communication network.

(Modification)

Although embodiments of the present invention are described above in detail with reference to drawings, specific configurations are not limited to those described above, and various design changes and the like can be made within a range not departing from the gist of the invention.

For example, the first communication unit 11 may be configured as a single communication unit integrated with the second communication unit 12. The LAA transceiver 112 of the first communication unit 11 may also be configured as a single transceiver integrated with the LIE transceiver 111.

In addition, frequencies or frequency bands described above are examples, and the other frequencies or frequency bands may also be used.

The embodiment described above can be realized in the following manner.

(1) A terminal device including a communication unit configured to perform communication using each of a first network and a second network, and a communication control unit configured to notify a base station device constituting the first network of allocated frequency band exclusion information indicating a frequency band to be excluded from frequency bands allocated to the terminal device and to control the communication unit so as to connect to the base station device using a frequency band allocated by the base station device.

(2) The terminal device of (1) in which the allocated frequency band exclusion information includes information indicating a frequency band used for communication by the second network.

(3) The terminal device of (1) or (2) further including a wireless environment measurement unit configured to measure a frequency band causing interference in communication by the first network, and the allocated frequency band exclusion information includes interference information indicating a frequency band measured by the wireless environment measurement unit.

(4) The terminal device of (3) in which, when the wireless environment measurement unit detects interference in a frequency band used for communication with the base station device, the communication control unit changes a frequency band used for communication by the second network to the frequency band not causing interference, which is detected by the wireless environment measurement unit.

(5) The terminal device of any one of (1) to (4) in which the communication control unit controls the communication unit so as to relay communication with other terminal devices connected to the second network to the first network.

(6) A communication system including a terminal device and a base station device, in which the terminal device includes a communication unit configured to perform communication using each of a first network and a second network, and a communication control unit configured to notify a base station device constituting the first network of allocated frequency band exclusion information indicating a frequency band to be excluded from frequency bands allocated to the terminal device, and to control the communication unit so as to connect to the base station device using a frequency band allocated by the base station device, and the base station device allocates a frequency band different from a frequency band indicated by the allocated frequency band exclusion information, notified by the terminal device, to the terminal device.

(7) A communication method of a terminal device including a communication unit configured to perform communication using each of a first network and a second network includes communication control processing for notifying a base station device constituting the first network of allocated frequency band exclusion information indicating a frequency band to be excluded from frequency bands allocated to the terminal device, and controlling the communication unit so as to connect to the base station device using a frequency band allocated by the base station device.

(8) A program which causes a computer of a terminal device including a communication unit configured to perform communication using each of a first network and a second network to execute a communication control procedure for notifying a base station device constituting the first network of allocated frequency band exclusion information indicating a frequency band to be excluded from frequency bands allocated to the terminal device, and controlling the communication unit so as to connect to the base station device using a frequency band allocated by the base station device.

A portion of the first terminal device 10, for example, the control unit 13, may also be realized by a computer. In this case, this may also be realized by recording a program for realizing this control function in a computer-readable recording medium, and causing a computer system to read and execute the program recorded in this recording medium.

In addition, a portion or all of the first terminal device 10 in the embodiments described above may also be realized as an integrated circuit such as large scale integration (LSI). Each functional block of a portion of the first terminal device 10 may be individually implemented as a processor, or a portion or all thereof may also be integrated into a processor. Moreover, a method of forming an integrated circuit is not limited to an LSI, and an integrated circuit may be realized by a dedicated circuit or a general purpose processor. In addition, when a technology for forming an integrated circuit replacing the LSI according to advances in semiconductor technology emerges, an integrated circuit using the technology may also be used.

DESCRIPTION OF THE REFERENCE SYMBOLS

1 Communication system
10 First terminal device
11 First communication unit
111 LTE transceiver
112 LAA transceiver
12 Second communication unit
121 Wireless LAN AP unit
13 Control unit
131 Communication control unit
132 Frequency selection unit
133 Frequency storage unit
134 Wireless LAN frequency switching unit
136 Peripheral wireless environment measurement unit
20 Second terminal device
30 Base station device
40 AP

The invention claimed is:

1. A terminal device comprising:
a communication unit configured to perform communication using each of a first network and a second network; and
a communication control unit configured to
transmit, to a base station device constituting the first network, a frequency band request signal for requesting a first frequency band in the first network in a case that the first frequency band is required for relaying communication between the base station device and another terminal device which is connected to the second network,
transmit, to the base station device, a frequency band report signal and a peripheral frequency band report signal in a case that the terminal device receives, from the base station device, a permission/rejection signal indicating a permission of allocation of the first frequency band, the frequency band report signal indicating a second frequency band used for communication between the terminal device and the another terminal device in the second network, the peripheral frequency band report signal indicating a peripheral frequency band in which an interference occurs in the first network,
receive, from the base station device, a frequency band allocation signal indicating an allocated frequency band which excludes the second frequency band and the peripheral frequency band, and
perform the relaying by making the communication unit start communication between the terminal device and the base station device by using, as the first frequency band, the allocated frequency band.

2. The terminal device according to claim 1, the terminal device further comprising:
a wireless environment measurement unit configured to measure a third frequency band causing interference in communication by the first network,
wherein the peripheral frequency band report signal includes an interference information indicating the third frequency band measured by the wireless environment measurement unit.

3. The terminal device according to claim 2,
wherein, in a case that the wireless environment measurement unit detects interference in the first frequency band used for communication between the terminal device and the base station device, the communication control unit is configured to change the second frequency band used for communication by the second network to a fourth frequency band not causing interference, which is detected by the wireless environment measurement unit.

4. The terminal device according to claim 1, wherein the communication control unit is configured to perform the relaying by making the communication unit start communication between the terminal device and the base station device by using the allocated frequency band, and by making the communication unit start communication between the terminal device and the another terminal device by using the second frequency band.

5. A communication system comprising a terminal device and a base station device,
wherein the terminal device comprises:
a communication unit configured to perform communication using each of a first network and a second network; and a communication control unit configured to
- transmit, to a base station device constituting the first network, a frequency band request signal for requesting a first frequency band in the first network in a case that the first frequency band is required for relaying communication between the base station device and another terminal device which is connected to the second network,
- transmit, to the base station device, a frequency band report signal and a peripheral frequency band report signal in a case that the terminal device receives, from the base station device, a permission/rejection signal indicating a permission of allocation of the first frequency band, the frequency band report signal indicating a second frequency band used for communication between the terminal device and the another terminal device in the second network, the peripheral frequency band report signal indicating a peripheral frequency band in which an interference occurs in the first network,
- receive, from the base station device, a frequency band allocation signal indicating an allocated frequency band which excludes the second frequency band and the peripheral frequency band, and
- perform the relaying by making the communication unit start communication between the terminal device and the base station device by using, as the first frequency band, the allocated frequency band, and wherein the base station device is configured to allocate, to the terminal device, the allocated frequency band different from the second frequency band and the peripheral frequency band.

6. A communication method by a terminal device which performs communication using each of a first network and a second network, the communication method comprises:
- transmitting, to a base station device constituting the first network, a frequency band request signal for requesting a first frequency band in the first network in a case that the first frequency band is required for relaying communication between the base station device and another terminal device which is connected to the second network,
- transmitting, to the base station device, a frequency band report signal and a peripheral frequency band report signal in a case that the terminal device receives, from the base station device, a permission/rejection signal indicating a permission of allocation of the first frequency band, the frequency band report signal indicating a second frequency band used for communication between the terminal device and the another terminal device in the second network, the peripheral frequency band report signal indicating a peripheral frequency band in which an interference occurs in the first network,
- receiving, from the base station device, a frequency band allocation signal indicating an allocated frequency band which excludes the second frequency band and the peripheral frequency band, and
- performing the relaying by starting communication between the terminal device and the base station device by using, as the first frequency band, the allocated frequency band.

* * * * *